US012584549B2

(12) United States Patent
Waltz et al.

(10) Patent No.: US 12,584,549 B2
(45) Date of Patent: Mar. 24, 2026

(54) ELECTRIC AXLE

(71) Applicant: Dana Heavy Vehicle Systems Group, LLC, Maumee, OH (US)

(72) Inventors: William F. Waltz, Toledo, OH (US); Jeffrey M. David, Cedar Park, TX (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/784,614

(22) Filed: Jul. 25, 2024

(65) Prior Publication Data

US 2025/0035198 A1      Jan. 30, 2025

Related U.S. Application Data

(60) Provisional application No. 63/515,687, filed on Jul. 26, 2023.

(51) Int. Cl.
B60K 1/00 (2006.01)
B60K 1/02 (2006.01)
(Continued)

(52) U.S. Cl.
CPC .............. F16H 48/10 (2013.01); B60K 1/00 (2013.01); B60K 1/02 (2013.01); F16H 37/082 (2013.01); F16H 48/11 (2013.01); B60K 2001/001 (2013.01); F16H 2048/104 (2013.01); F16H 2048/106 (2013.01); (Continued)

(58) Field of Classification Search
CPC ......... F16H 2048/104; F16H 2048/106; F16H 2200/2023; B60K 1/00; B60K 2001/001; B60K 1/02
See application file for complete search history.

(56) References Cited

U.S. PATENT DOCUMENTS 5,845,732 A * 12/1998 Taniguchi .............. B60K 17/16
180/65.6
8,246,499 B2 * 8/2012 Iwanaka ................ B60K 6/365
475/5
(Continued)

FOREIGN PATENT DOCUMENTS

DE      102010032256 A1 * 1/2012 ............. F16H 3/663
DE      102022000466 A1 * 3/2023 ............... B60K 1/02
(Continued)

OTHER PUBLICATIONS

Waltz, W. et al., "Electric Axle," U.S. Appl. No. 18/784,452, filed Jul. 25, 2024, 44 pages.
(Continued)

*Primary Examiner* — Sherry L Estremsky
(74) *Attorney, Agent, or Firm* — McCoy Russell LLP

(57) ABSTRACT
Methods and systems are provided for an electric axle. The electric axle system includes, in one example, a first electric machine and a planetary reduction differential configured to receive mechanical power from the first electric machine. The planetary reduction differential includes a first planetary gear set directly rotationally coupled to a second planetary gear set. In the electric axle system, a sun gear in the first planetary gear set is directly coupled to an input shaft of the planetary reduction differential.

15 Claims, 10 Drawing Sheets

(51) Int. Cl.
    *F16H 37/08*          (2006.01)
    *F16H 48/10*          (2012.01)
    *F16H 48/11*          (2012.01)

(52) U.S. Cl.
    CPC ................ *F16H 2200/0021* (2013.01); *F16H 2200/0034* (2013.01); *F16H 2200/2005* (2013.01); *F16H 2200/2023* (2013.01)

(56)            References Cited

U.S. PATENT DOCUMENTS

| | | | | |
|---|---|---|---|---|
| 10,982,745 | B2 * | 4/2021 | Holmes | .................... B60K 1/00 |
| 11,618,318 | B2 * | 4/2023 | Beck | ....................... F16H 48/10 475/5 |
| 11,970,058 | B1 * | 4/2024 | Mordukhovich | .... B60K 17/046 |
| 2020/0317046 | A1 * | 10/2020 | Flaxman | ................ B60K 17/16 |

FOREIGN PATENT DOCUMENTS

| | | | | | |
|---|---|---|---|---|---|
| DE | 102022000037 | B3 * | 4/2023 | ............. | F16H 48/36 |
| JP | 2019094930 | A * | 6/2019 | ............. | F16H 48/36 |

OTHER PUBLICATIONS

Waltz, W. et al., "All Wheel Drive Electric Transmission," U.S. Appl. No. 18/784,472, filed Jul. 25, 2024, 33 pages.
Waltz, W. et al., "Electric Axle," U.S. Appl. No. 18/784,584, filed Jul. 25, 2024, 37 pages.

* cited by examiner

ELECTRIC AXLE

CROSS REFERENCE TO RELATED APPLICATION

The present application claims priority to U.S. Provisional Application No. 63/515,687, entitled "ELECTRIC AXLE", and filed on Jul. 26, 2023. The entire contents of the above-listed application are hereby incorporated by reference for all purposes.

TECHNICAL FIELD

The present description relates generally to an electric axle with two concentric planetary gear sets.

BACKGROUND AND SUMMARY

Electric axles have been used in a variety of vehicle platforms to fulfill the electrification needs of different vehicle sectors. These electric axles include traction motors and transmissions which may be mounted in different arrangements depending on the spatial constraints and end-use goals of the vehicle platform. Electric axles may be more capable of simplified and efficient vehicle platform integration when compared to electric drives with the traction motor, transmission, and drive axles designed as separate units.

In electric axle design for electric vehicles (or industrial applications), there is an ever-present quest to increase power density. Attempts have been made to increase electric axle power density by designing the motor with higher rotational speeds. However, increasing the motor's rotational velocity causes the power path to increase to achieve a usable output speed. To elaborate, increasing the gear passes is one way to achieve greater output ratio. Increasing the number of gear passes in the axle, increases the size of the electric axle package envelope, and decreases the electric axle power density. Therefore, at least some electric axles have fallen short of achieving end-use design goals in relation to space efficiency and power density. The inventors have therefore recognized a desire to reduce the packaging space and increase the power density of electric axles. The inventors have additionally recognized the need to increase output ratio while passively differentiating mechanical power to multiple drive axles from an electric axle in a small package envelope.

The issues described above may be addressed by an electric axle system. The electric axle system includes, in one example, an electric machine and a planetary reduction differential that is configured to receive mechanical power from the electric machine. The planetary reduction differential includes a first planetary gear set directly rotationally coupled to a second planetary gear set. In the planetary reduction differential, a sun gear in the first planetary gear set is directly coupled to an input shaft of the planetary reduction differential. Further, in the electric axle system, a carrier in the first planetary gear set is directly coupled to an output shaft. In this way, a space efficient and power dense electric axle system is achieved.

In one example, the electric axle system may further include a Ravigneaux three-speed mode planetary gear set rotationally coupled and positioned coaxial to a planetary reduction differential and a mode clutch that is configured to selectively ground a carrier or a ring gear in the Ravigneaux gear set in a first mode, selectively ground a sun gear in the Ravigneaux gear set in a second mode, and selectively couple the carrier or the ring gear to the sun gear in the Ravigneaux gear set in a third mode. In this way, the Ravigneaux three-speed mode planetary gear set effectively achieves three gear ratio modes in a space efficient package, expanding the system's speed change capabilities.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A planetary reduction differentiating electric axle that achieves increased compactness and power density is described herein. To achieve the space efficiency and power density targets, the electric axle includes, in one example, a planetary reduction differential that receives input from a traction motor (either from a single speed gear train or a multi-speed mode planetary gear set) and has two simple planetary gear sets that are directly rotationally coupled to one another. The first simple planetary gear set is coupled to an input shaft via a sun gear, in one example. Further, a ring gear or a carrier in the second simple planetary gear set may be rotationally coupled to an output shaft and a ring gear in the first simple planetary gear set may be rotationally coupled to a sun gear in the second simple planetary gear set. Using a planetary reduction differential with the abovementioned simple planetary gear set layout, enables the electric axle's packaging efficiency to be increased, the width of the planetary reduction differential to be reduced, and the overall axial length of the electric axle to be reduced, if desired, thereby allowing a more compact and power dense electric axle architecture to be achieved.

As described herein a simple planetary gear set is a planetary gear set with solely a ring gear, a sun gear, a carrier, and multiple planet gears that are in the same plane as the ring gear and the sun gear and rotate on the carrier. Each planet gear meshingly engages both the sun gear and the ring gear. Further, as described herein a meshed planet compound planetary gear set is a planetary gear set with a ring gear, a sun gear, and multiple sets of planet gears in mesh in the plane of the ring gear and sun gear and circumferentially aligned in the same plane as the ring and the sun gears. The planet sets include an inner planet gear and an outer planet gear. The inner planet gear is meshingly engaged with the sun gear and an outer planet gear. The outer planet gear is meshingly engaged with an inner planet gear and the ring gear.

Figure 1A:
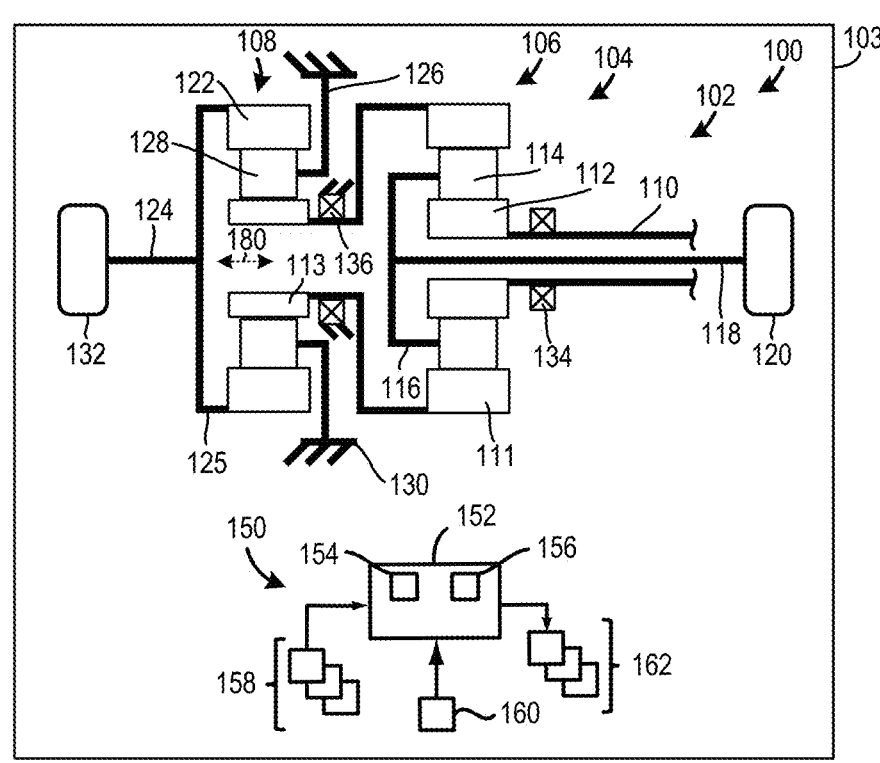
FIGS. 1A-1B and 14 show examples of an electric axle with a planetary reduction differential that includes two simple planetary gear sets.
Figure 1A:
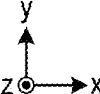

FIG. 1A shows an example of an electric axle 100 with a transmission 102 that includes a planetary reduction differential 104. The transmission 102 may be a single speed transmission or a multi-speed transmission as discussed in greater detail herein with regard to FIGS. 11-13 and 17.

The electric axle 100 is included in an electric vehicle (EV) 103, in the illustrated example. It will be understood that the other electric axles described herein may also be included in a similar EV. The EV 103 may be an all-electric vehicle (e.g., battery electric vehicle (BEV)), in one example, or a hybrid electric vehicle, in another example. As such, vehicles that utilize the electric axles described herein may also have an internal combustion engine (e.g., a spark ignition engine, a compression ignition engine, combinations thereof, and the like), in some examples. Thus, the electric axles described herein may be used in cars, trucks, all-terrain vehicles (ATVs), commercial vehicles, light vehicles, off-highway vehicles, mining vehicles, rail vehicles, manufacturing machinery, industrial machinery, and the like.

The planetary reduction differential 104 includes a first simple planetary gear set 106 and a second simple planetary gear set 108. The first and second simple planetary gear sets are coaxially arranged, in the illustrated example. In this way, the planetary reduction differential's space efficiency is increased. In the illustrated example, an input shaft 110 which is rotationally connected to an electric machine, either directly or indirectly via a gear train, is coupled to a sun gear 112 in the first simple planetary gear set 106.

The first and second simple planetary gear sets 106 and 108 are directly rotationally connected to one another, allowing the axial length of the planetary reduction differential 104 to be decreased when compared to more complex architectures. To elaborate, in the illustrated example, a ring gear 111 in the first simple planetary gear set 106 is rotationally coupled to the sun gear 113 in the second simple planetary gear set 108. The first simple planetary gear set 106 further includes a set of planet gears 114 that are rotatably mounted on a carrier 116. In the illustrated example, the carrier 116 is directly rotationally coupled to an output shaft 118 (e.g., an axle shaft such as a half shaft) that is in turn rotationally coupled to a drive wheel 120. Alternatively, the output shaft 118 may be coupled to a wheel-end gear reduction and/or other suitable mechanical component that is coupled to the drive wheel 120. Further, in the illustrated example, a ring gear 122 in the second simple planetary gear set 108 is rotationally coupled to another output shaft 124 via a shaft 125, for example. Still further, in the illustrated example, a carrier 126 (on which a set of planet gears 128 are rotatably mounted) is grounded via a stationary component 130. Additionally, in the illustrated example the output shaft 124 is rotationally coupled to a drive wheel 132 or may be coupled to the drive wheel via a wheel-end gear reduction and/or other suitable mechanical components, as indicated above. Further, other coupling configurations between the first and second simple planetary gear sets may be used in other examples.

A bearing 134 may be coupled to the input shaft 110 of the planetary reduction differential 104. As described herein a bearing may include an inner race, roller elements (e.g., cylindrical rollers, spherical balls, tapered cylindrical rollers, needle rollers, bushings, and the like), and an outer race. A bearing 136 is coupled to the sun gear 113, in the illustrated example. The bearings in the transmission may have another suitable arrangement and/or additional bearings may be used in the planetary reduction differential in alternate embodiments.

A coordinate axis system is provided in FIG. 1A, as well as FIGS. 2-17, for reference and to orient the views, when appropriate. The z-axis may be a vertical axis (e.g., parallel to a gravitational axis), the x-axis may be a lateral axis (e.g., horizontal axis), and the y-axis may be a longitudinal axis, in one example. However, in other examples, the axes may have other orientations. The rotational axis 180 of the sun gear 113 is further provided for reference in FIG. 1A, as previously indicated. The simple planetary gear sets are coaxially arranged, in the illustrated example. The other electric transmissions described herein also exhibit the coaxial arrangement between the simple planetary gear sets in the planetary reduction differential. In this way, the electric transmission is able to achieve a desired space efficiency.

As shown in FIG. 1A, the EV 103 may further include a control system 150 with a controller 152. The controller 152 may include a microcomputer with components such as a processor 154 (e.g., a microprocessor unit), input/output ports, an electronic storage medium 156 for executable programs and calibration values, e.g., a read-only memory chip, random access memory, keep alive memory, a data bus, and the like. The storage medium may be programmed with computer readable data representing instructions which are executable by a processor for performing the methods, control techniques, and the like described herein as well as other variants that are anticipated but not specifically listed. Therefore, the electronic storage medium 156 may hold instructions stored therein that when executed by the processor 154 cause the controller 152 to perform the various method steps described herein.

The controller 152 may receive various signals from sensors 158 coupled to different regions of the EV 103 and specifically the electric axle 100. For example, the sensors 158 may include one or more motor speed sensors (elaborated upon below), shaft/gear speed sensors, thermocouples, pressure sensors, a pedal position sensor to detect a depression of an operator-actuated pedal (e.g., an accelerator pedal and/or a brake pedal), speed sensors at the vehicle wheels, and the like. An input device 160 (e.g., accelerator pedal, brake pedal, gear selector, combinations thereof, and the like) may further provide input signals indicative of an operator's intent for vehicle control.

Upon receiving the signals from the various sensors 158 of FIG. 1A, the controller 152 processes the received signals, and employs various actuators 162 of vehicle components to adjust the components based on the received signals and instructions stored on the memory of controller 152. For example, the controller 152 may receive an accelerator pedal signal indicative of an operator request for a vehicle acceleration adjustment. In response, the controller 152 may command operation of inverters which are electrically coupled to an electric machine which provides power to the gear set to increase the power delivered from the motor to the transmission 102. The other controllable components in the vehicle may function in a similar manner with regard to sensor signals, control commands, and actuator adjustment, for example. Further, the control system 150 may be used in any of the electric axle systems and transmissions described herein.

In the multi-speed transmission example, that is expanded upon herein, the controller 152 may include instructions that when executed cause a mode clutch to shift between different operating modes (e.g., a first mode and a second mode, in one example, or a first mode, a second mode, and a third mode, in yet another example) based on vehicle and axle operating conditions. However, electric axles with a greater number of speeds, such as a four speed electric axle, a five speed electric axle, etc., have been contemplated. For instance, the electric axle 100 may be operated in the first mode when the vehicle is traveling at lower vehicle speeds. When, the vehicle speed surpasses a first threshold, the mode clutch may shift to the second mode and when the vehicle speed surpasses a second threshold, the clutch may shift from the second mode to the third mode. This shifting sequence may also be implemented in the reverse order through the modes. Further, the shifting sequence may not occur sequentially and therefore may skip modes, if desired. For example, the electric axle may be commanded to start in second mode or may downshift from third mode to first mode. The control system 150 described above may be used in any of the electric axles and transmissions described herein and may be used to implement the methods, control techniques, etc. discussed herein.

Figure 1B:
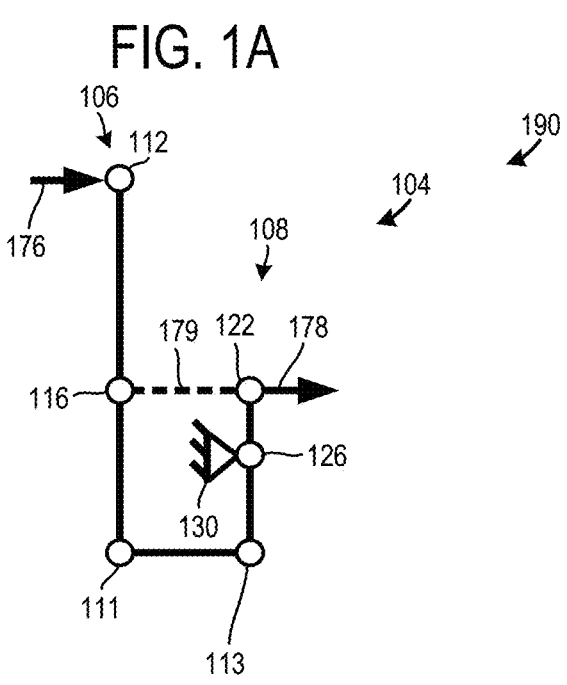

FIG. 1B shows a lever diagram 190 of the architecture of the planetary reduction differential 104, depicted in FIG. 1A. The input of the planetary reduction differential 104 is indicated via arrow 176 at the sun gear node 112 and the outputs of the planetary reduction differential are indicated via arrow 178. Line 179 indicates the connection formed between the carrier node 116 and the ring gear node 122 via the drive wheels and a road surface. The rotational direction of the planetary reduction differential's input is the same as the rotational directions of the planetary reduction differential's outputs, in the illustrated example. However, one knowledgeable in lever diagrams and planetary design would quickly realize that other planetary reduction differential designs are possible that utilize the same lever diagram shape, but with different planetary elements connected at the lever diagram nodes. These too have been considered by the inventors.

Figure 14:
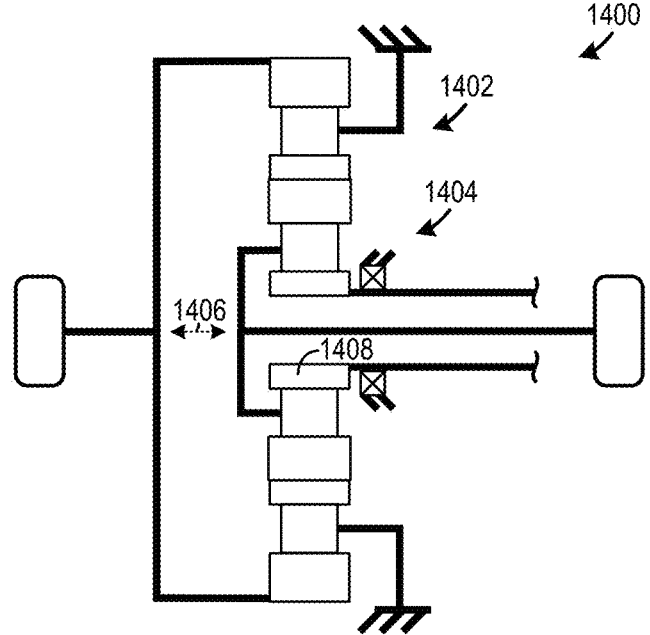
Figure 14:
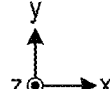

FIG. 14 shows another example of a planetary reduction differential 1400 with a coaxial arrangement. To elaborate, the planetary reduction differential 1400 includes a first simple planetary gear set 1402 that is concentric with a second simple planetary gear set 1404. A rotational axis 1406 of a sun gear 1408 of the second simple planetary gear set 1404 is provided for reference.

For the coaxial planetary reduction differential shown in FIG. 1A to reduce (e.g., minimize) overall diameter and possibly reuse parts (if desired), both simple planetary ring to sun ratios (RTS) may approach a ratio of 1.618 and the output reduction ratio will be 5.236, in one use-case example. A ratio of 1.618 requires that the tooth count for $2P=2*\#T_{planet}$, $S=\#T_{sun}$, and $R=\#T_{ring}$ be consecutive numbers in the Fibonacci Sequence, and the additional constraint that $2P=2*\#T_{planet}$ be an even number. There may be a minimal number of ranges that satisfy these conditions within a feasible and manufacturable range of tooth counts.

A practical use-case range may be 34/55/89. Where: 2P=34, S=55, & R=89. Further, it will be understood that the practical range 34/55/89 contains two tooth counts with prime numbers.

For a concentric planetary reduction differential, such as the planetary reduction differential 1400 shown in FIG. 14, the simple planetary ratios diverge from 1.618 with the inner input planetary RTS ratio increasing and the outer output planetary RTS ratio decreasing. One example would be an inner planetary RTS of 3.000 and an outer planetary RTS of 1.333 for an output reduction ratio of 8.000, in one use-case example.

FIGS. 2-4 and 15 show alternative architectures for planetary reduction differentials that include combinations of simple planetary gear sets and/or meshed planet compound planetary gear sets in electric axles. In all of the planetary reduction differential embodiments, depicted in FIGS. 2-4 and 15, an input shaft 200 is coupled to a sun gear 202 in a first planetary gear set, similar to the planetary reduction differential 104, shown in FIG. 1A. As such, the input shafts and the sun gears are similarly numbered in FIGS. 2-4 and 15 and redundant description is omitted for brevity.

Figure 2:
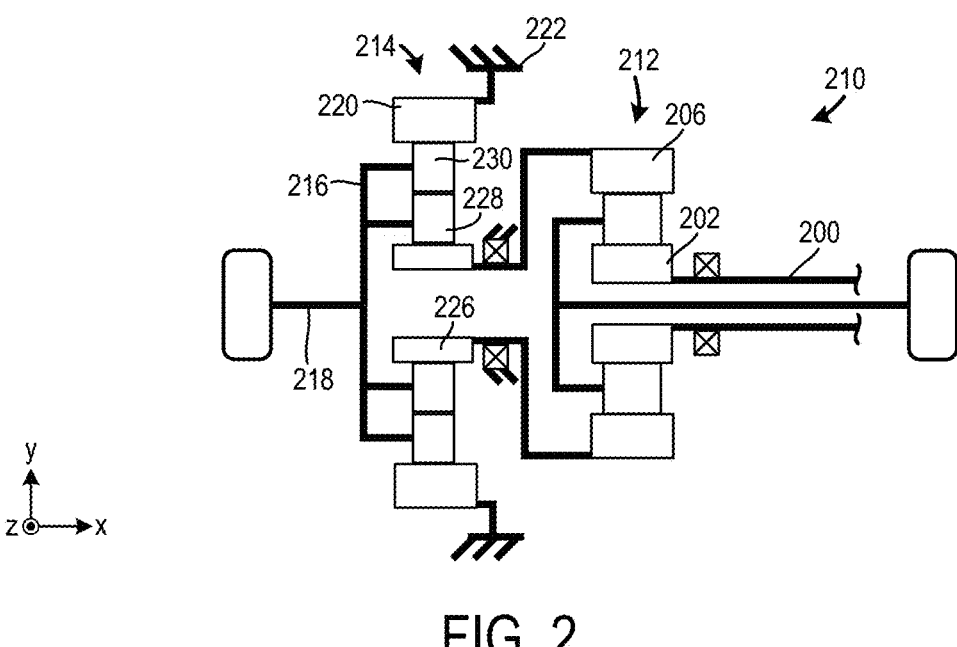
FIGS. 2-4 show different exemplary architectures of an electric axle with a planetary reduction differential that includes combinations of simple planetary gear sets and meshed planet compound planetary gear sets.

FIG. 2 shows a planetary reduction differential 210 with a first simple planetary gear set 212 and a second meshed planet compound planetary gear set 214. To expound, the meshed planet compound planetary gear set 214 comprises two sets of planetary gears 228 and 230 where the planetary gears mesh with one another, in the illustrated example. Further the planetary gears in the set of planetary gears 228 mesh with a sun gear 226 and the planetary gears in the set of planetary gears 230 mesh with a ring gear 220. The sets of planetary gears 228 and 230 are rotatably mounted on a carrier 216, where a carrier 216 is coupled to an output shaft 218 and a ring gear 220 is grounded via a stationary component 222 (e.g., a housing such as a housing that at least partially encloses the transmission and/or traction motor). The meshed planet compound planetary gear set 214 is rotationally coupled to the simple planetary gear set 212. To expound, a ring gear 206 in the simple planetary gear set 212 is rotatably coupled to a sun gear 226 in the meshed planet compound planetary gear set 214. The other components in the first and second planetary gear sets shown in FIG. 2 have a similar architecture to the planetary gear sets shown in FIG. 1A and redundant description is therefore omitted for brevity.

Figure 3:
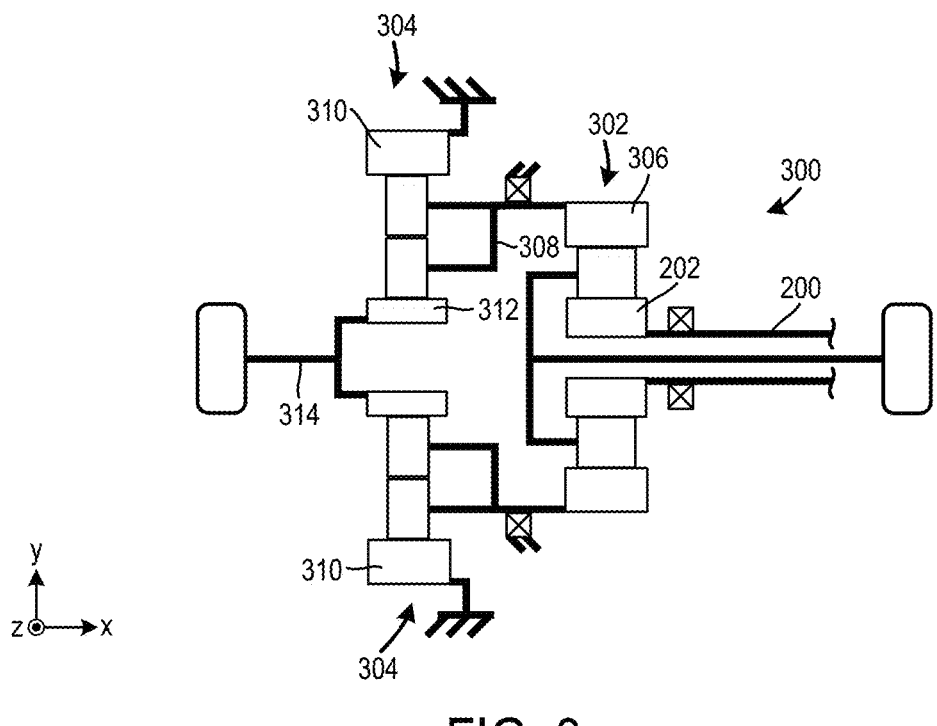

FIG. 3 shows a transmission 300 with first simple planetary gear set 302 and a second meshed planet compound planetary gear set 304 that are rotationally coupled via ring gear 306 and a carrier 308 in the first simple planetary gear set 302 and the second meshed planet compound planetary gear set, respectively. Additionally, in the illustrated example, a ring gear 310 in the second meshed planet compound planetary gear set is grounded and a sun gear 312 is rotationally coupled to an output shaft 314.

Figure 4:
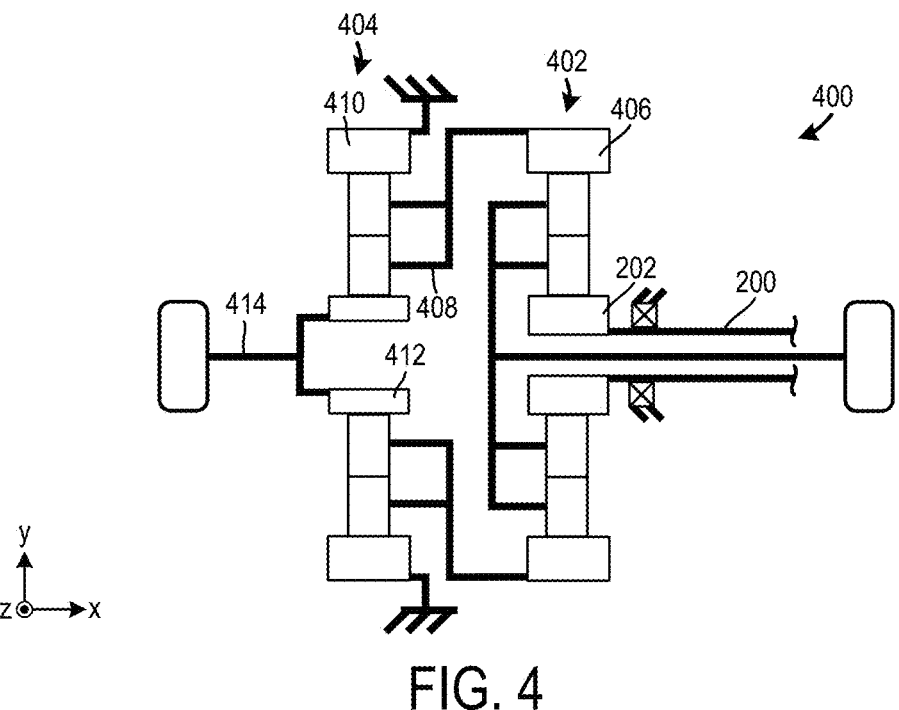

FIG. 4 shows a transmission 400 with first meshed planet compound planetary gear set 402 and a second meshed planet compound planetary gear set 404 that are rotationally coupled via ring gear 406 and a carrier 408 in the first and second meshed planet compound planetary gear sets, respectively. Additionally, in the illustrated example, a ring gear 410 in the second meshed planet compound planetary gear set is grounded and a sun 412 is rotationally coupled to an output shaft 414.

FIGS. 5-9 show different exemplary architectures for gear trains and traction motors (e.g., motor-generators) which may provide input for the planetary reduction differential 104, that is shown in FIG. 1A and previously described.

Therefore, redundant description of the planetary reduction differential is omitted for concision.

Figure 5:
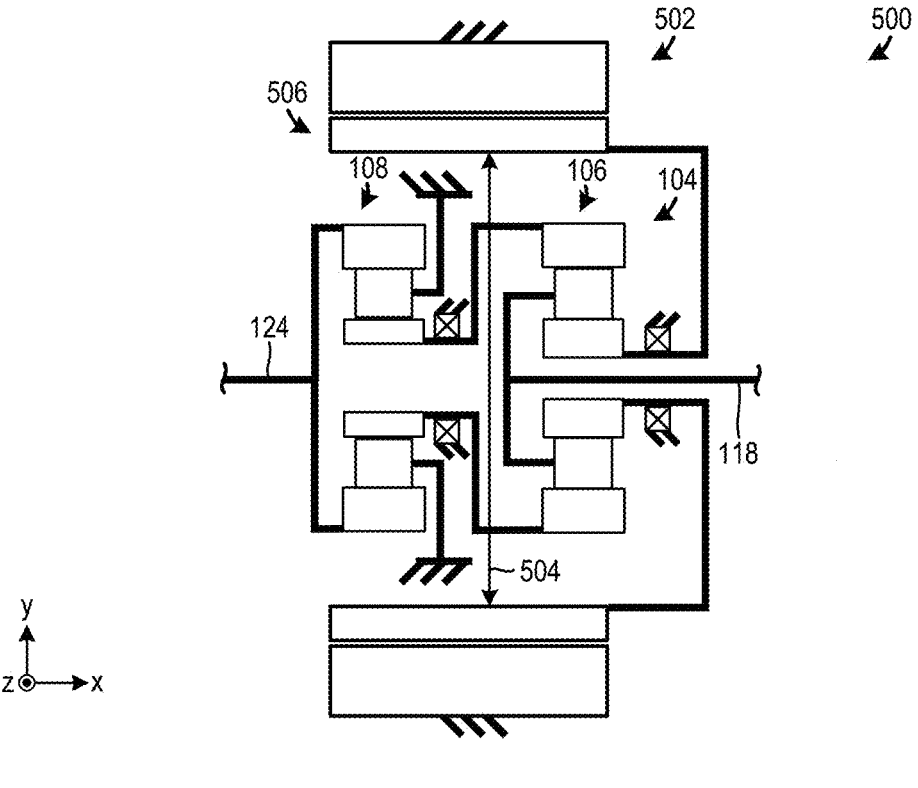
FIGS. 5-9 show different exemplary architectures for electric machines and gear trains in an electric axle that provide input for a planetary reduction differential with two simple planetary gear sets.

FIG. 5 specifically shows an electric axle 500 with an electric machine 502 positioned concentric to the output shaft 118 and at least partially circumferentially enclosing the first and second simple planetary gear sets 106 and 108 in the planetary reduction differential 104. Specifically, an inner diameter 504 of a rotor 506 of the electric machine 502 is at least partially circumferentially enclosing the first and second simple planetary gear sets 106 and 108 in the planetary reduction differential 104.

Figure 6:
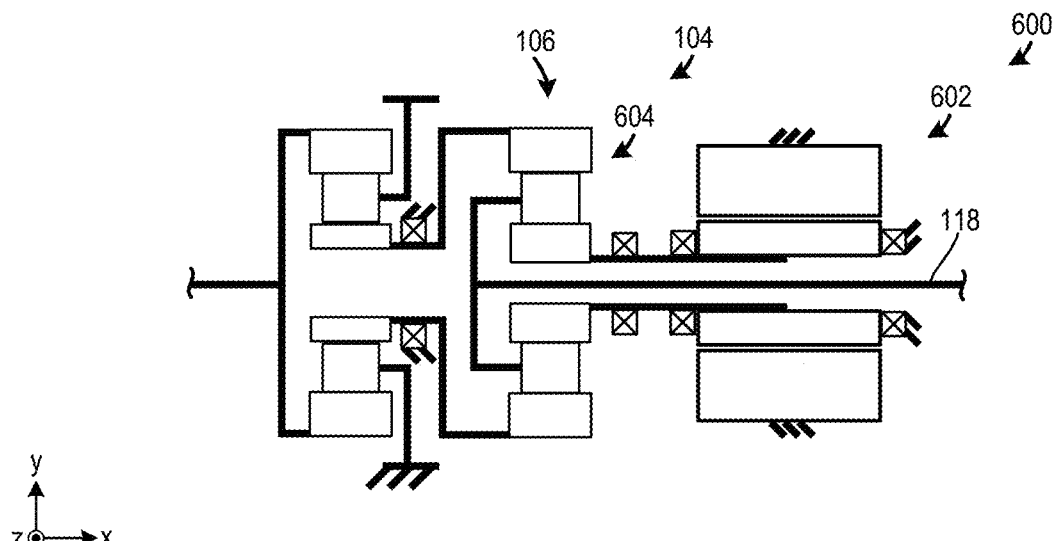

FIG. 6 specifically shows an electric axle 600 with an electric machine 602 that is positioned concentric to the output shaft 118 and positioned on an outboard axial side 604 of the first simple planetary gear set 106. A portion of the output shaft 118 extends through an opening in the electric machine 602, in the illustrated example. In this way, the electric axle's space efficiency is increased.

Figure 7:
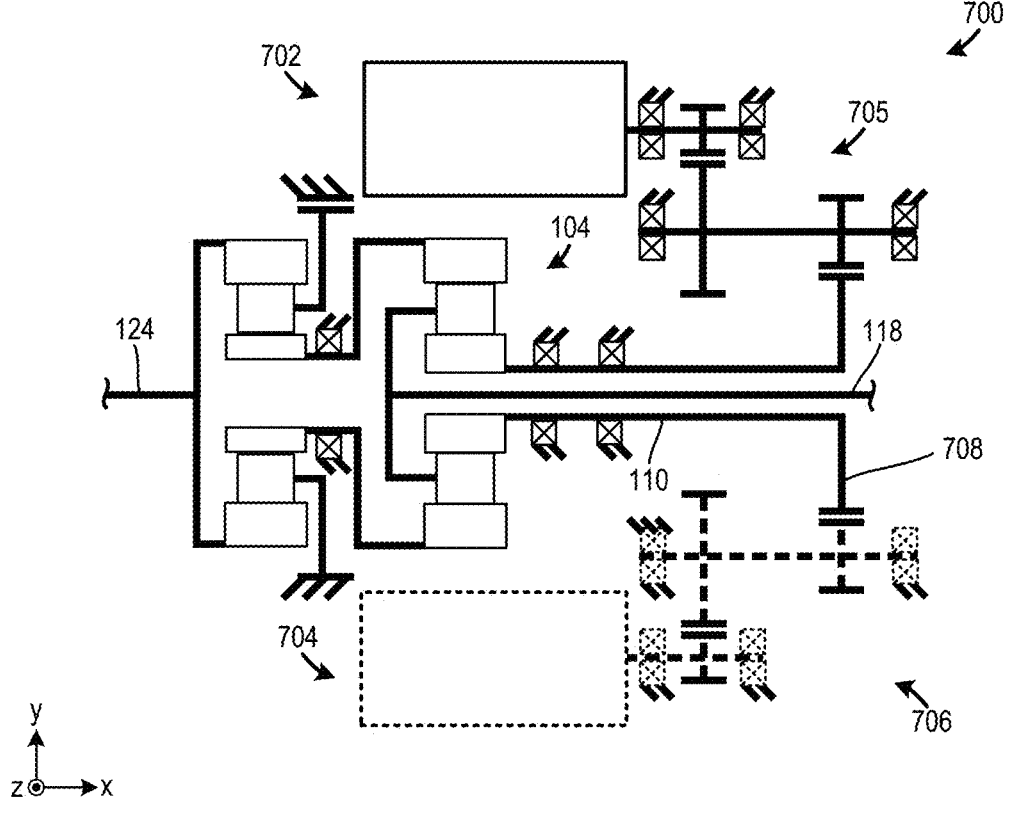

FIG. 7 shows an electric axle 700 with two electric machines 702 and 704 which are each arranged parallel to the output shaft 118 and mechanically attached to the input of the planetary reduction differential using gear trains 705 and 706. A gear 708 meshes with gears in each of the gear trains 705 and 706 and provides a mechanical connection between the input shaft 110 of the planetary reduction differential 104. It will be appreciated that the electric machine 704 and corresponding gear train 706 are optional and therefore may be omitted from the electric axle in alternate embodiments. More generally, a variety of gear train layouts that are connected to the input of the planetary reduction differential may be used. For instance, the gear trains used to connect the first electric machine and/or the second electric machine may include fewer gear passes or additional gear passes. In alternate examples, one or more planetary gear sets (e.g., simple planetary gear sets, compound planetary gear sets, and the like) may be used to connect the one or more electric machine(s) to the planetary reduction differential. For instance, a planetary gear set which is coaxial to the electric machine may be used to connect the electric machine to the planetary reduction differential. Additionally or alternatively, a planetary gear set which is positioned coaxial to the rotational axis of the output shafts 118 and 124 may be used to rotationally couple the electric machine to the planetary reduction differential. In any of the embodiments where one or more additional planetary gear sets provide the input connection for the planetary reduction differential gear set, a carrier in the additional planetary gear set may be grounded, a ring gear in the additional planetary gear set may be grounded, or a sun gear in the additional planetary gear set may be grounded, in different examples. Additional gear passes, chains, belts, combinations thereof, and the like may additionally or alternatively be used to transfer mechanical power between the one or more electric machines to the planetary reduction differential.

Further, it will be understood, that any of the electric axles described herein may include a second electric machine, if desired. For instance, the second electric machine may be coupled to the input of the planetary reduction differential in an identical manner to the mechanical connection formed between the first electric machine and the input of the planetary reduction differential, in one example. In another example the second electric machine may be coupled to the input of the planetary reduction differential using a different gearing arrangement to allow a different electric machine to planetary reduction differential input ratio, which may allow the second electric machine to have different characteristics than the first electric machine. Additionally, a disconnect clutch may be arranged between the second electric machine and the planetary reduction differential to decouple the second electric machine from the planetary reduction differential to further increase efficiency, in some instances.

Figures 8, 9:
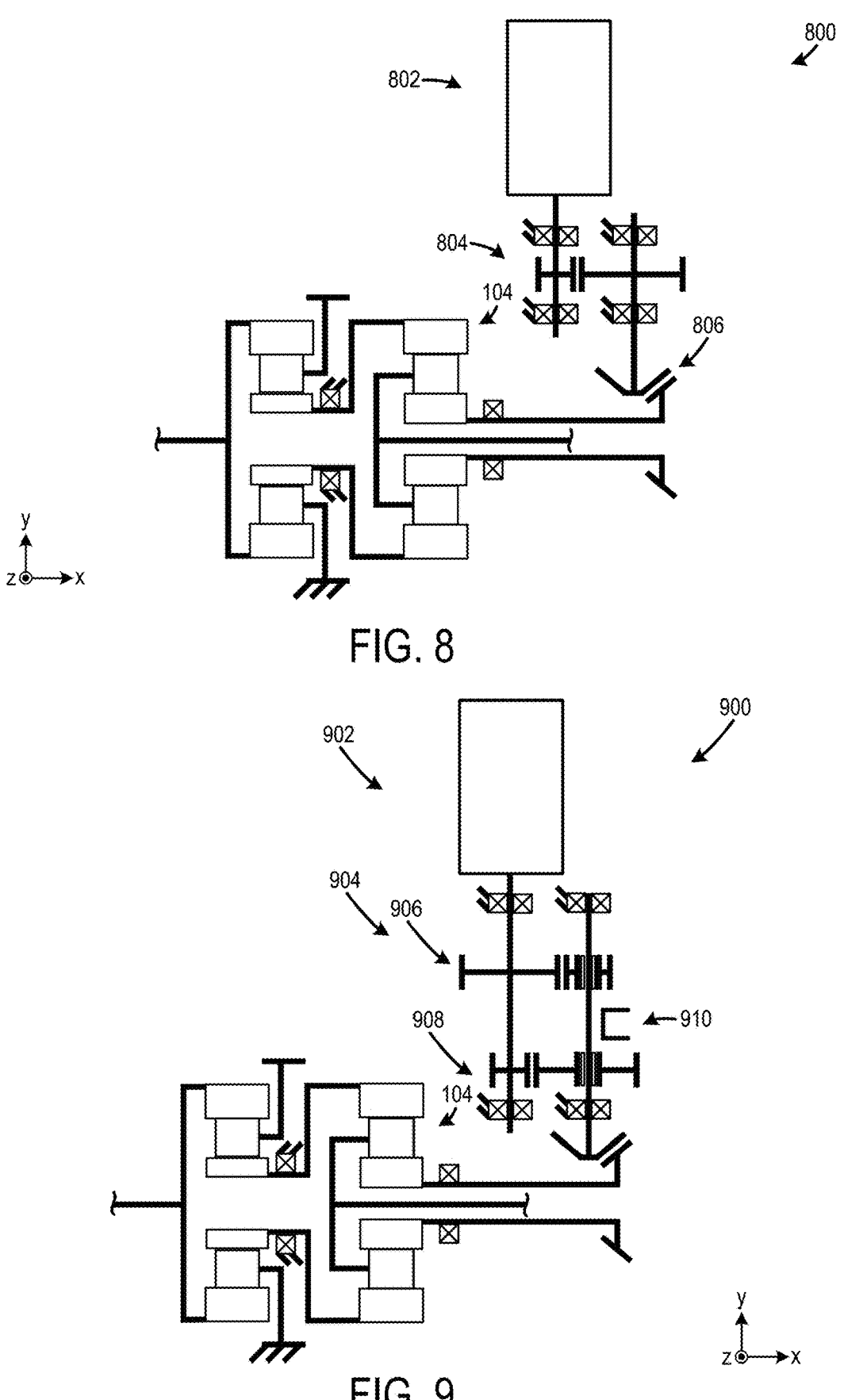

FIG. 8 shows an electric axle 800 with electric machine 802 arranged perpendicular to the rotational axis of the planetary reduction differential 104. A gear train 804 which includes bevel gears 806 provides input to the planetary reduction differential 104. Similar to exemplary electric axle 700 depicted in FIG. 7, the addition of a second electric machine, and a second electric machine disconnect clutch has been considered.

FIG. 9 shows an electric axle 900 with an electric machine 902 arranged perpendicular to the rotational axis of the planetary reduction differential 104. In the illustrated example, the electric axle includes an input gear train 904 with multiple gear reductions 906 and 908 which are selectable via a clutch 910. In this way, the selectable gearing in the transmission may be further expanded which may allow the electric machine to be more efficiently operated. Similar to exemplary electric axle 700 depicted in FIG. 7, the addition of a second electric machine, and a second electric machine disconnect clutch has been considered. As noted above, a variety of gear train layouts which provide input to the planetary reduction differential or a mode planetary gear set (expanded upon herein) have been contemplated.

It will be appreciated that electric axles which include combined input gear train and/or motor arrangement features from two or more of FIGS. 5-9 have been envisioned. Further, any of the different motor and/or input gear train arrangements may be used with any of the transmission architectures or combinations of the transmission architectures described herein.

Figure 10:
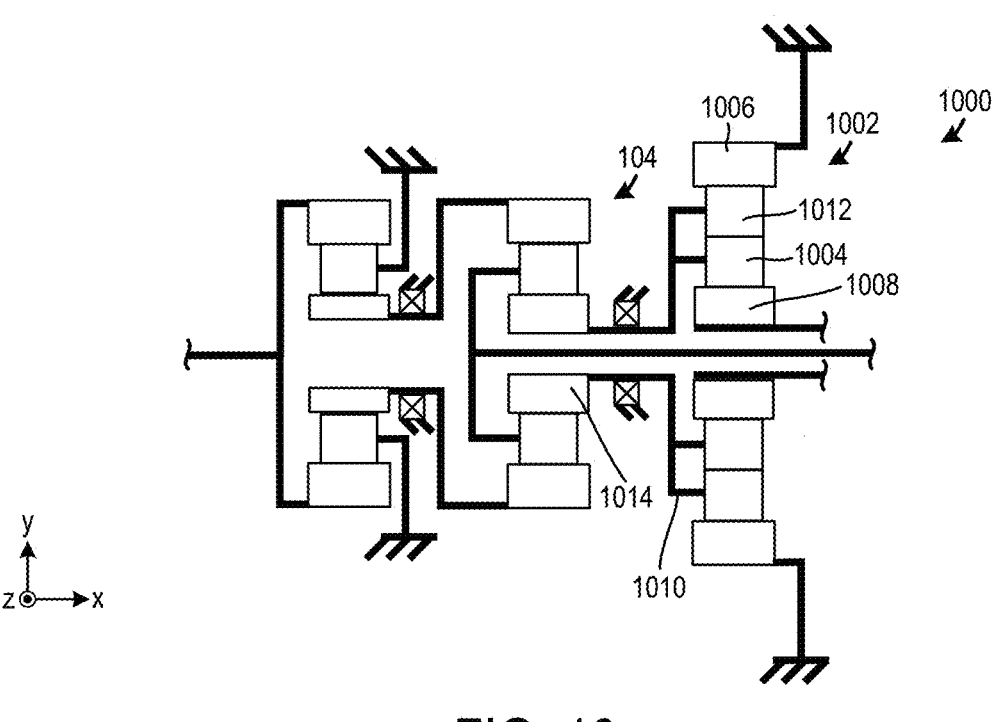
FIG. 10 shows an example of an input gear train for a planetary reduction differential with two simple planetary gear sets.

FIG. 10 shows another example of a transmission 1000 with the planetary reduction differential 104 and a meshed planet compound planetary gear set 1002 that provides input to the planetary reduction differential 104. The meshed planet compound planetary gear set 1002 comprises two sets of planet gears 1004 and 1012 where the planetary gears mesh with one another. Further, the planet gears in the set of planetary gears 1012 mesh with a ring gear 1006 and the other planet gears in the set of planetary gears 1004 mesh with a sun gear 1008. The sets of planetary gears 1004 and 1012 are rotatably mounted on a carrier 1010. In the illustrated example, a carrier 1010 is rotationally coupled to the planetary reduction differential sun gear 1014, and the sun gear 1008 is rotationally coupled to upstream components (e.g., gear trains, electric machines, combinations thereof, and the like). Further in the illustrated example, ring gear 1006 is grounded. Alternatively, the meshed planet compound planetary carrier 1010 could be grounded and the meshed planet compound planetary ring gear 1006 could be rotationally coupled to the planetary reduction differential sun gear 1014 in another example.

FIGS. 11-13 and 17 show different examples of mode planetary gear sets that may be coupled to the planetary reduction differential 104 via the input shaft 110. The mode planetary gear sets provide the electric axle transmission with multi-speed functionality which allows axle efficiency to be increased on any of the other planetary reduction differentials or combinations of the planetary reduction differentials described herein. Further, the mode planetary gear sets may be used with any of the traction motor and gear train configurations shown in FIGS. 2-10, and 14-16 or combinations of the motor and gear train configurations. Each of the mode planetary gear sets shown in FIGS. 11-13 and 17 includes a mode clutch that is configured to shift the corresponding transmission between operating modes, as discussed in greater detail herein.

Figure 11:
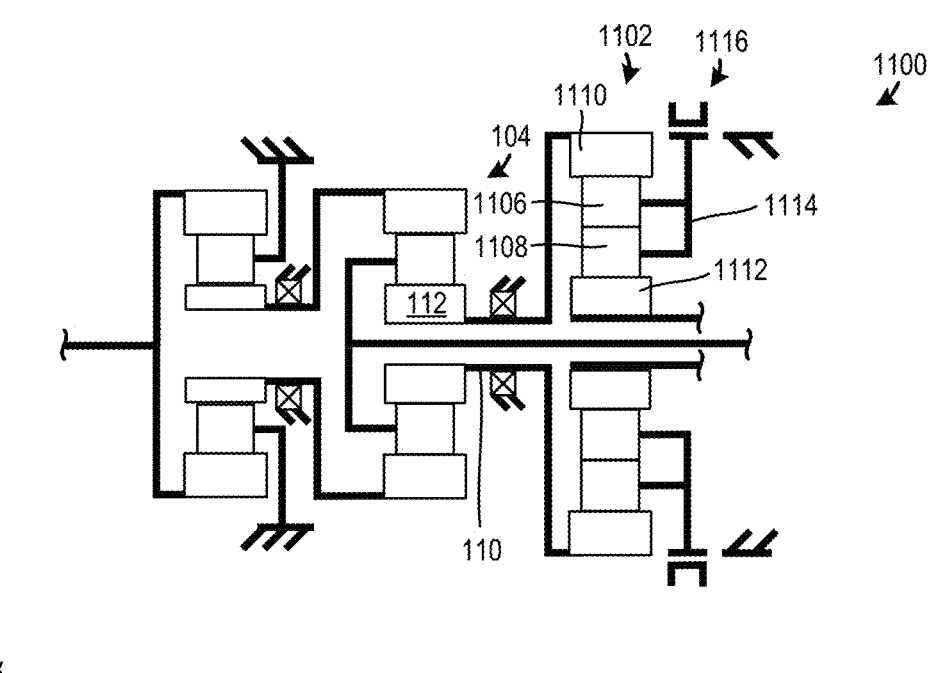
FIGS. 11-13 show different exemplary architectures for mode planetary gear sets that provide input for a planetary reduction differential with two simple planetary gear sets.

FIG. 11 specifically discloses a transmission 1100 for an electric axle. The transmission 1100 includes a two-speed mode planetary gear set 1102 that is embodied as a meshed planet compound planetary gear set. The two-speed mode planetary gear set 1102 includes a first set of planet gears 1106 that mesh with a second set of planet gears 1108. The first set of planet gears 1106 mesh with a ring gear 1110 and the second set of planet gears 1108 mesh with a sun gear 1112. The sets of planet gears 1106 and 1108 are rotatably mounted on a carrier 1114. A mode clutch 1116 is configured to ground the carrier 1114 in a first mode and rotationally couple the carrier 1114 to the ring gear 1110 in a second mode. It will be appreciated that the first mode may be used during lower speed axle operation and the second mode may be used during higher speed axle operation. Additionally, the ring gear 1110 is rotationally coupled to the planetary reduction differential sun gear 112, in the illustrated example.

The mode clutch 1116 may be a dog clutch, a synchronizer, a friction clutch (e.g., a wet friction clutch), a radial clutch, a face clutch, a curvic clutch, a magnetic clutch, combinations thereof, and the like. The other clutches described herein may also be any of the aforementioned types or combinations of clutch types. Further, the mode clutch 1116 as well as the other clutches described herein may be actuated via electro-mechanic actuators, pneumatic actuators, hydraulic actuators, electro-magnetic actuators, barrel cam actuators, combinations thereof, and the like. Shift forks, such as translational or rotational shift forks, may specifically be used to actuate at least a portion of the clutches described herein.

Further, the two speed mode planetary gear set shown in FIG. 11 may have a 1:1 ratio in one of the modes, in one use-case example. However, the electric axle may have a variety of ratios which may be selected based on the end-use design goals of the vehicle platform. As such, the ratios illustrated in the FIGS. 1A-17 are use-case ratios and different ratios may be used in the electric axles.

Figure 12:
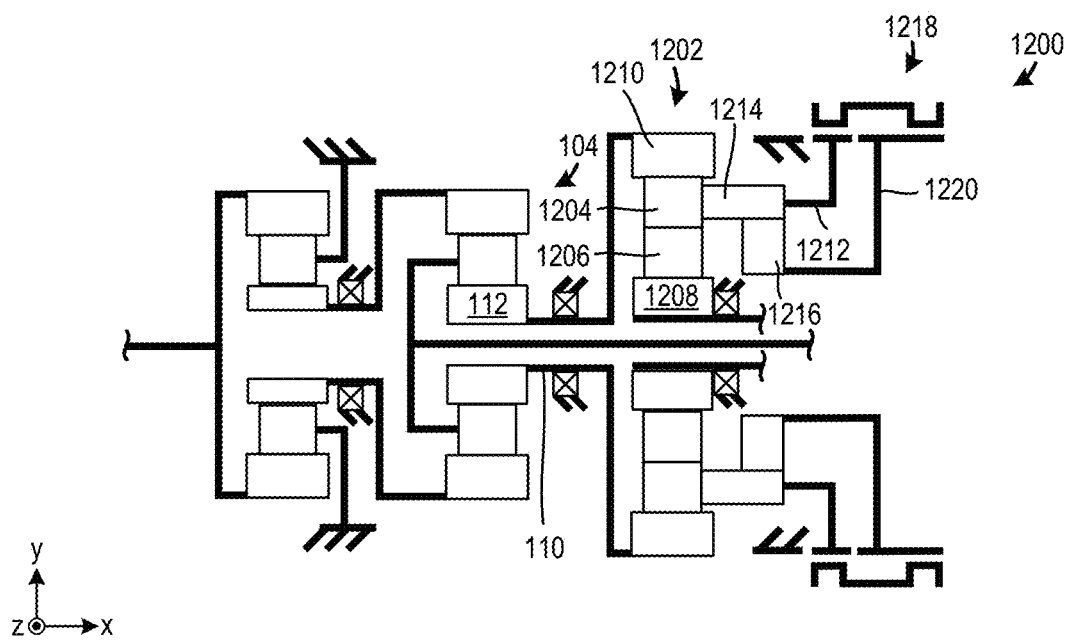

FIG. 12 depicts transmission 1200 for an electric axle. The transmission 1200 includes a mode planetary gear set 1202 that is embodied as a meshed planet compound planetary gear set and specifically a Ravigneaux-speed mode planetary gear set. The Ravigneaux gear set 1202 includes a set of planet gears 1204 that mesh with another set of planet gears 1206. The set of planet gears 1206 mesh with a first sun gear 1208 and the set of planet gears 1204 mesh with a ring gear 1210. The set of planet gears 1204 and 1206 are rotatably mounted on a carrier 1212. Another set of planet gears 1214 is rotationally coupled to planet gear 1204 and meshes with a second sun gear 1216. Planet gear 1214 may be larger, smaller, or the same size as planet gear 1204. Further, the ring gear 1210 is rotationally coupled to the planetary reduction differential sun gear 112, in the illustrated example.

A mode clutch 1218 is configured to ground the carrier 1212 in a first mode, ground the second sun gear 1216 in a second mode via shaft 1220, and rotationally couple the carrier 1212 to the second sun gear 1216 in a third mode. In this way, the transmission achieves three speed functionality in a space efficient package, thereby expanding the system's speed change capabilities. However, mode planetary gear sets with a fewer or greater number of operating modes have been contemplated such as a two speed transmission, a four speed transmission, etc.

Figure 13:
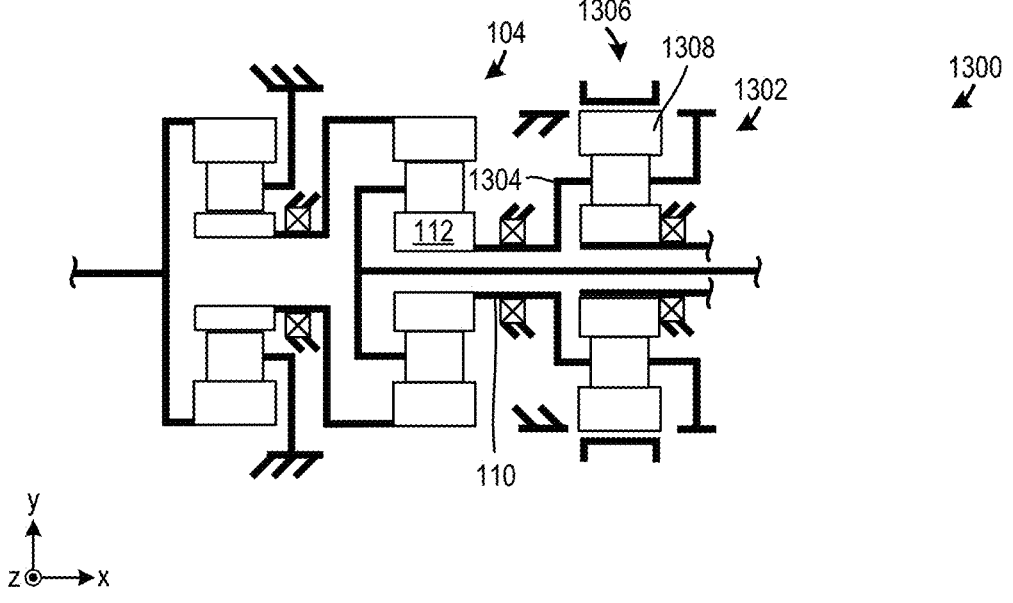

FIG. 13 shows another example of a transmission 1300 for an electric axle. The transmission 1300, in the illustrated example, includes a two-speed mode planetary gear set 1302 with a different architecture than the previously described mode planetary gear sets. To expound, the two-speed mode planetary gear set 1302 includes a carrier 1304 that is rotationally coupled to the sun gear 112 of the planetary reduction differential 104. Further, the two-speed mode planetary gear set 1302 is a simple planetary gear set in the illustrated example. A mode clutch 1306 is configured to ground a ring gear 1308 in a first mode, and rotationally couple the carrier 1304 and the ring gear 1308 for a second mode. In this way, the transmission achieves two speed functionality. The mode planetary gear set 1302 is embodied as a simple planetary gear set, in the illustrated example, to decrease system complexity and increase system compactness, when compared to meshed planet compound planetary gear sets. However, the two-speed mode planetary gear set may be a meshed planet compound planetary gear set or another suitable type of planetary gear set, as discussed above.

Figure 15:
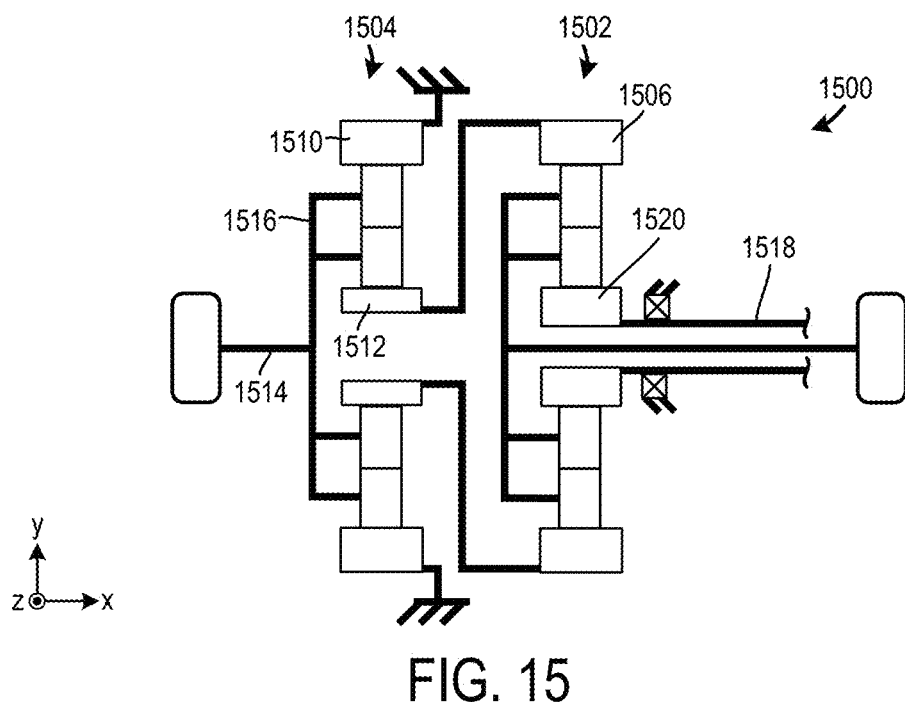
FIG. 15 shows a different exemplary architectures of an electric axle with a planetary reduction differential that includes two meshed planet compound planetary gear sets.

FIG. 15 shows a transmission 1500 with a first meshed planet compound planetary gear set 1502 and a second meshed planet compound planetary gear set 1504 that are rotationally coupled via ring gear 1506 and a sun gear 1512 in the first and second meshed planet compound planetary gear sets, respectively. Additionally, in the illustrated example, a ring gear 1510 in the second meshed planet compound planetary gear set is grounded and a carrier 1516 is rotationally coupled to an output shaft 1514. Further, the transmission 1500 includes an input shaft 1518 that is rotationally coupled to a sun gear 1520 in the a first meshed planet compound planetary gear set 1502, in the illustrated example.

Figure 16:
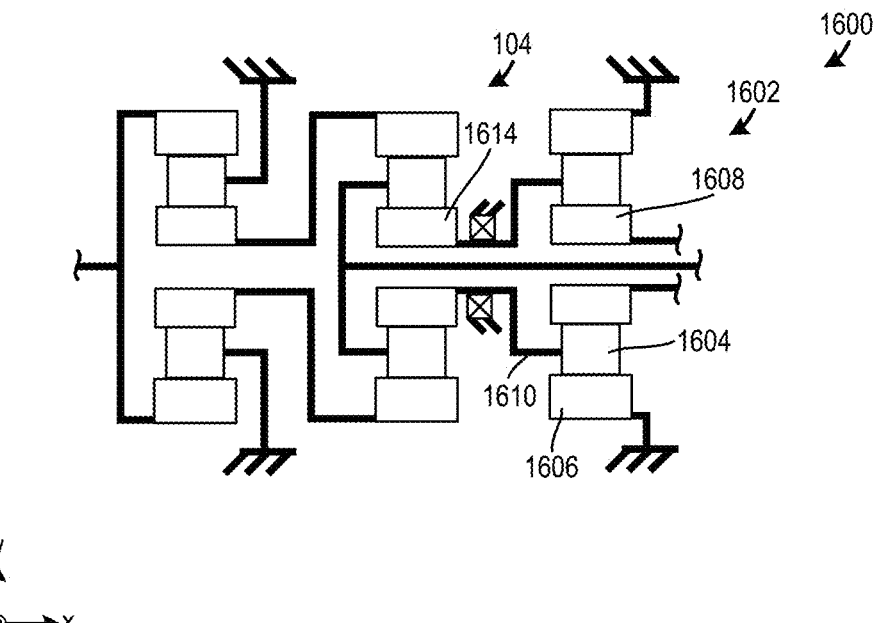
FIG. 16 shows an example of another input gear train for a planetary reduction differential with two simple planetary gear sets.

FIG. 16 shows another example of a transmission 1600 with the planetary reduction differential 104 and a simple planetary gear set 1602 that provides input to the planetary reduction differential. The planet gears in the set of planetary gears 1604 mesh with a ring gear 1606 and with a sun gear 1608. The sets of planetary gears 1604 are rotatably mounted on a carrier 1610. In the illustrated example, a carrier 1610 is rotationally coupled to the planetary reduction differential sun gear 1614, and the simple planetary sun gear 1608 is rotationally coupled to upstream components (e.g., gear trains, electric machines, combinations thereof, and the like). Further in the illustrated example, ring gear 1606 is grounded. Alternatively, the input simple planetary carrier 1610 could be grounded and the input simple planetary ring gear 1606 could be rotationally coupled to the planetary reduction differential sun gear 1614 in another example.

Figure 17:
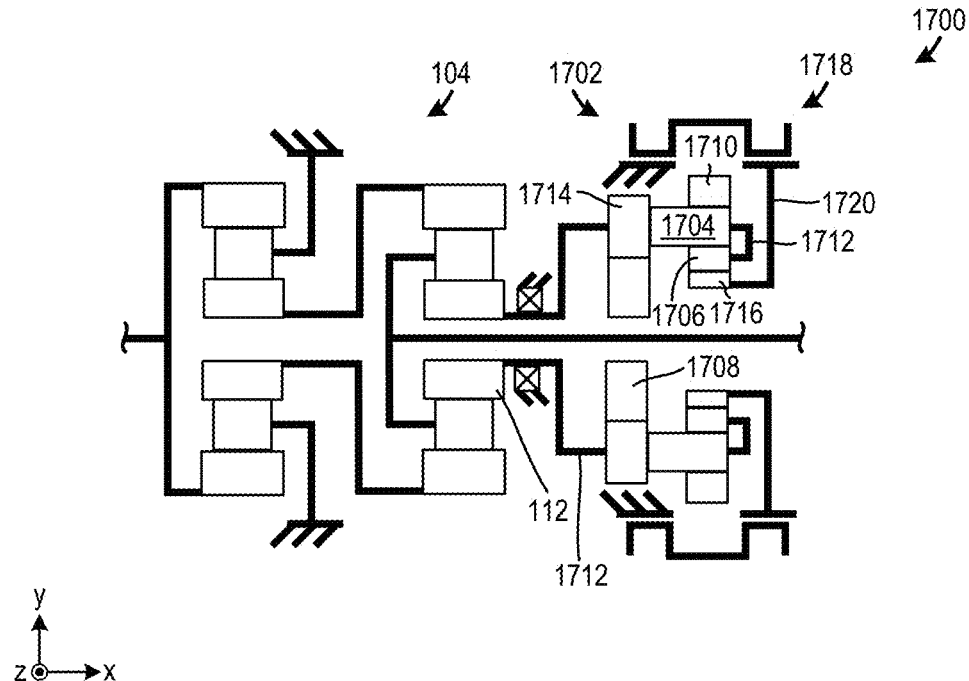
FIG. 17 shows a different exemplary architecture for a mode planetary gear set that provides input for a planetary reduction differential with two simple planetary gear sets.

FIG. 17 depicts transmission 1700 for an electric axle. The transmission 1700 includes a mode planetary gear set 1702 that is embodied as a Ravigneaux three-speed mode planetary gear set. The Ravigneaux three-speed mode planetary gear set 1702 includes a set of planet gears 1704 that mesh with another set of planet gears 1706. The set of planet gears 1706 mesh with a second sun gear 1716 and the set of planet gears 1704 mesh with a ring gear 1710. The set of planet gears 1704 and 1706 are rotatably mounted on a carrier 1712. Another set of planet gears 1714 is rotationally coupled to planet gear 1704 and meshes with a first sun gear 1708. Planet gear 1714 may be larger, smaller, or the same size as planet gear 1704. Further, the carrier 1712 is rotationally coupled to the planetary reduction differential sun gear 112, in the illustrated example.

A mode clutch 1718 is configured to ground the ring 1710 in a first mode, ground the second sun gear 1716 in a second mode via shaft 1720, and rotationally couple the ring gear 1710 to the second sun gear 1716 in a third mode. In this way, the transmission achieves three speed functionality in a space efficient package, thereby expanding the system's speed change capabilities. However, mode planetary gear sets with a fewer or greater number of operating modes have been contemplated such as a two speed transmission, a four speed transmission, etc.

The output shafts in the electric axles described herein may be directly coupled to drive wheels, gear reductions (e.g., planetary gear reductions in the wheel hubs), or other suitable mechanical components in applications that demand a differential output in vehicles (e.g., cars, trucks, boats, ATVs, commercial vehicles, light vehicles, off-highway vehicles, mining vehicles, rail vehicles, and the like) as well as other applications (e.g., manufacturing applications such as manufacturing machinery, industrial applications such as industrial machinery, and the like). When the electric axles describe herein are used in vehicles, it will be appreciated that the transmissions may be used as trans-axles in electric vehicles (EVs) such as all-electric vehicles (e.g., battery electric vehicles (BEVs)) and hybrid electric vehicles. As such, the vehicles that utilize the transmissions described herein may have an internal combustion engine (e.g., a spark ignition engine, a compression ignition engine, combinations thereof, and the like), in some examples. Further, the electric axles described herein may have axle disconnect functionality.

Gearing in the planetary gear sets described herein may have spur or helical profiles. As described above, the second motors in the electric axles described herein are optional. Further, in one example, the gearing used to mechanically couple the motors to the transmission input may be identical and engage a final gear on the output centerline. In another example, the gearing associated with the second motor may be different from the gearing associated with the first motor and engage the final gear on the output centerline. Further, in one example, the gearing associated with the second motor may include a clutch to decouple the second electric machine from the planetary reduction differential to further increase efficiency, in some instances.

Still further, in one example, the gearing associated with the second motor may engage the gearing associated with the first motor prior to the final gear on the output centerline. Even further in one example, the gearing associated with the second motor may have a different ratio and engage the gearing associated with the first motor prior to the final gear on the output centerline.

Further, the exact location and number of the bearings in the electric axle architectures illustrated in the FIGS. 1A-17 is suggestive and exemplary in nature and it will be understood that alternate bearing layouts, types, quantities, etc. may be used in alternate examples. Further, it will be understood that the electric axles may utilize one or more transverse motors which may be coupled to the transmission's input via hypoid gears or other suitable bevel or spiral gears. In such an example, the motor may be engaged to the hypoid gear with a mating pinion, and between the motor and pinion there could be other gear passes and/or shiftable gears. Shiftable gears may be positioned on either parallel mating shaft, in different examples. Further, additional gear passes may be added to the electric axles, if desired. Still further, the planetary gear sets described herein that provide input to the planetary reduction differential may take the form of simple planetary gear sets, meshed planet compound planetary gear sets, stepped planet compound planetary gear sets, and/or magnetic planetary gear sets.

Further, it will be appreciated that the various motor arrangements illustrated in FIGS. 5-9 may be used in any of the transmissions (and electric axle systems, correspondingly) described herein such as any of the transmissions shown in FIGS. 1A-4, and 10-17 or combinations of the electric axles. Further, different combinations of the motor architectures and the transmission architectures that include multiple features from separate embodiments have been envisioned.

The invention will be further described in the following paragraphs. In one aspect, an electric axle system is provided that comprises a first electric machine; and a planetary reduction differential configured to receive mechanical power from the first electric machine; wherein the planetary reduction differential includes a first planetary gear set directly rotationally coupled to a second planetary gear set; wherein a sun gear in the first planetary gear set is directly coupled to an input shaft of the planetary reduction differential; and wherein a carrier in the first planetary gear set is directly coupled to an output shaft. In one example, the first planetary gear set may be a simple planetary gear set and the second planetary gear set may be a simple planetary gear set; and/or the first and second planetary gear sets may have an identical ring gear to sun gear ratio. In another example, a ring gear in the second planetary gear set may be directly coupled to an output shaft; a ring gear in the first planetary gear set may be directly rotationally coupled to a sun gear in the second planetary gear set; and a carrier in the second simple planetary gear set may be grounded. In another example, the first planetary gear set may be a simple planetary gear set and the second planetary gear set may be a meshed planet compound planetary gear set; and a ring gear in the second planetary gear set may be grounded. In yet another example, a sun gear in the second planetary gear set may be directly coupled to an output shaft; and a ring gear in the first planetary gear set may be directly rotationally coupled to a carrier in the second planetary gear set. In yet another example, a carrier in the second planetary gear set may be directly coupled to an output shaft; and a ring gear in the first planetary gear set may be directly rotationally coupled to a sun gear in the second planetary gear set. In yet another example, the first planetary gear set may be a meshed planet compound planetary gear set and the second planetary gear set is a meshed planet compound planetary gear set; and a ring gear in the second planetary gear set may be grounded. In another example, a sun gear in the second planetary gear set may be directly coupled to an output shaft; and a ring gear in the first planetary gear set may be directly rotationally coupled to a carrier in the second planetary gear set. In another example, a carrier in the second planetary gear set may be directly coupled to an output shaft; and a ring gear in the first planetary gear set may be directly rotationally coupled to a sun gear in the second planetary gear set. In another example, the electric axle system may further comprise a Ravigneaux three-speed mode planetary gear set rotationally coupled and positioned coaxial to the planetary reduction differential; and a mode clutch configured to: ground a carrier or a ring gear in the Ravigneaux three-speed mode planetary gear set, in a first mode; ground a second sun gear in the Ravigneaux three-speed mode planetary gear set, in a second mode; and rotationally couple the carrier or a ring gear to the second sun gear in the Ravigneaux three-speed mode planetary gear set, in a third mode; wherein a first sun gear in the Ravigneaux three-speed mode planetary gear set is rotationally coupled to the first electric machine. In another example, the electric axle system may further comprise a two-speed mode planetary gear set rotationally coupled to the input shaft; and a mode clutch configured to: in a first mode, ground a carrier or a ring gear in the two-speed mode planetary gear set; and in a second mode, rotationally couple a carrier to the ring gear in the two-speed mode planetary gear set; wherein a sun gear in the two-speed mode planetary gear set is rotationally coupled to the first electric machine. In another example, the first electric machine may be positioned coaxial, parallel, or transverse, to the planetary reduction differential. In yet another example, the electric axle system may further comprise a second electric machine rotationally coupled to the planetary reduction differential.

In another aspect, a method for operation of an electric axle is provided that comprises operating a first electric machine to deliver mechanical power to a planetary reduction differential; wherein the electric axle includes: the first electric machine; and the planetary reduction differential that is configured to receive mechanical power from the first electric machine; wherein the planetary reduction differential comprises a first planetary gear set directly rotationally coupled to a second planetary gear set; wherein a sun gear in the first planetary gear set is directly coupled to an input shaft of the planetary reduction differential; and wherein a carrier in the first planetary gear set is directly coupled to an output shaft. In one example, the method may further comprise operating a second electric machine to deliver mechanical power to the planetary reduction differential. In another example, the method may further comprise operating a mode clutch in a Ravigneaux three-speed mode planetary gear set that is rotationally coupled to the planetary reduction differential to shift the Ravigneaux three-speed mode planetary gear set between two operating modes included in a set of three operating modes.

In another aspect, an electric axle is provided that comprises an electric machine; and a planetary reduction differential configured to receive mechanical power from the electric machine; wherein the planetary reduction differential includes a first planetary gear set directly rotationally coupled to a second planetary gear set; wherein a sun gear in the first planetary gear set is directly coupled to an input shaft of the planetary reduction differential; wherein a carrier in the first planetary gear set is directly coupled to an output shaft; wherein a ring gear in the second planetary gear set is directly coupled to an output shaft; wherein a ring gear in the first planetary gear set is directly rotationally coupled to a sun gear in the second planetary gear set; and wherein a carrier in the second planetary gear set is grounded. In one example, the electric axle may further comprise a Ravigneaux three-speed mode planetary gear set rotationally coupled and positioned coaxial to the planetary reduction differential; and a mode clutch configured to selectively transition the Ravigneaux three-speed mode planetary gear set between two of three modes; wherein the mode clutch is configured to: in a first mode, ground a carrier or a ring gear in the Ravigneaux three-speed mode planetary gear set; in a second mode, ground a second sun gear in the Ravigneaux three-speed mode planetary gear set; and in a third mode, rotationally couple the carrier or a ring gear to the second sun gear in the Ravigneaux gear set. In another example, a ring gear or a carrier in the Ravigneaux three-speed mode planetary gear set may be coupled to the planetary reduction differential input shaft. In yet another example, the electric axle may further comprise a two-speed mode planetary gear set directly rotationally coupled to the input shaft; and a mode clutch configured to: in a first mode, ground a carrier or a ring gear in the two-speed mode planetary gear set; and in a second mode, rotationally couple a carrier to the ring gear in the two-speed mode planetary gear set; wherein the ring gear or the carrier in the two-speed mode planetary gear set is rotationally coupled to the planetary reduction differential input shaft.

FIGS. 1A-17 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

Motor and shift control logic/programs, inverters, electronic control units (ECUs), memory storage, throttle, brake, speed, and inclination sensors and the like, shift actuators, etc. may further be used in any of the electric axles and transmissions described herein.

FIGS. 1A-17 provide for a method for electric axle operation wherein the transmission shifts between the two modes in a set of transmission operating modes based on vehicle operating conditions. The method may even further include, selectively disconnecting the axle via operation of an axle disconnect clutch.

Further, the axles and transmissions described herein may include control systems that include a controller with a processor and memory that stores instructions for carrying out the method steps described herein. To elaborate, the control methods and routines disclosed herein may be stored as executable instructions in non-transitory memory and may be carried out by a system including the controller in combination with the various sensors and actuators. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for case of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the system, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation nor restriction. It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The technology may be used as a stand-alone, or used in combination with other power transmission systems not limited to machinery and propulsion systems for tandem axles, electric tag axles, P4 axles, EVs (e.g., HEVs, BEVs, etc.) agriculture vehicles or machines, marine vehicles or machines, motorcycles, recreational vehicles, on and off highway vehicles, mining vehicles, rail vehicles, manufacturing machinery, industrial machinery, and the like, as an example. The subject matter of the present disclosure includes all novel and non-obvious combinations and sub-combinations of the various systems and configurations, and other features, functions, and/or properties disclosed herein. It will be apparent to persons skilled in the relevant arts that the disclosed subject matter may be embodied in other specific forms without departing from the spirit of the subject matter.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric axle system, comprising:
a first electric machine;
a planetary reduction differential configured to receive mechanical power from the first electric machine;
a Ravigneaux three-speed mode planetary gear set rotationally coupled and positioned coaxial to the planetary reduction differential; and
a mode clutch configured to:
ground a carrier or a ring gear in the Ravigneaux three-speed mode planetary gear set, in a first mode;

ground a second sun gear in the Ravigneaux three-speed mode planetary gear set, in a second mode; and
rotationally couple the carrier or the ring gear to the second sun gear in the Ravigneaux three-speed mode planetary gear set, in a third mode;
wherein a first sun gear in the Ravigneaux three-speed mode planetary gear set is rotationally coupled to the first electric machine;
wherein the planetary reduction differential includes a first planetary gear set directly rotationally coupled to a second planetary gear set;
wherein a sun gear in the first planetary gear set is directly coupled to an input shaft of the planetary reduction differential; and
wherein a carrier in the first planetary gear set is directly coupled to an output shaft.

2. The electric axle system of claim 1, wherein:
the first planetary gear set is a simple planetary gear set and the second planetary gear set is a simple planetary gear set; and/or
the first and second planetary gear sets have an identical ring gear to sun gear ratio.

3. The electric axle system of claim 2, wherein:
a ring gear in the second planetary gear set is directly coupled to an output shaft;
a ring gear in the first planetary gear set is directly rotationally coupled to a sun gear in the second planetary gear set; and
a carrier in the second simple planetary gear set is grounded.

4. The electric axle system of claim 1, wherein:
the first planetary gear set is a simple planetary gear set and the second planetary gear set is a meshed planet compound planetary gear set; and
a ring gear in the second planetary gear set is grounded.

5. The electric axle system of claim 4, wherein:
a sun gear in the second planetary gear set is directly coupled to an output shaft; and
a ring gear in the first planetary gear set is directly rotationally coupled to a carrier in the second planetary gear set.

6. The electric axle system of claim 4, wherein:
a carrier in the second planetary gear set is directly coupled to an output shaft; and
a ring gear in the first planetary gear set is directly rotationally coupled to a sun gear in the second planetary gear set.

7. The electric axle system of claim 1, wherein:
the first planetary gear set is a meshed planet compound planetary gear set and the second planetary gear set is a meshed planet compound planetary gear set; and
a ring gear in the second planetary gear set is grounded.

8. The electric axle system of claim 7, wherein:
a sun gear in the second planetary gear set is directly coupled to an output shaft; and
a ring gear in the first planetary gear set is directly rotationally coupled to a carrier in the second planetary gear set.

9. The electric axle system of claim 7, wherein:
a carrier in the second planetary gear set is directly coupled to an output shaft; and
a ring gear in the first planetary gear set is directly rotationally coupled to a sun gear in the second planetary gear set.

10. The electric axle system of claim 1, wherein the first electric machine is positioned coaxial, parallel, or transverse, to the planetary reduction differential.

11. The electric axle system of claim 1, further comprising a second electric machine rotationally coupled to the planetary reduction differential.

12. A method for operation of an electric axle, comprising:

operating a first electric machine to deliver mechanical power to a planetary reduction differential; and operating a mode clutch in a Ravigneaux three-speed mode planetary gear set that is rotationally coupled to the planetary reduction differential to shift the Ravigneaux three-speed mode planetary gear set between two operating modes included in a set of three operating modes;

wherein the electric axle includes:

the first electric machine; and the planetary reduction differential that is configured to receive mechanical power from the first electric machine;

wherein the planetary reduction differential comprises a first planetary gear set directly rotationally coupled to a second planetary gear set;

wherein a sun gear in the first planetary gear set is directly coupled to an input shaft of the planetary reduction differential; and wherein a carrier in the first planetary gear set is directly coupled to an output shaft.

13. The method of claim 12, further comprising operating a second electric machine to deliver mechanical power to the planetary reduction differential.

14. An electric axle, comprising:

an electric machine;

a planetary reduction differential configured to receive mechanical power from the electric machine;

a Ravigneaux three-speed mode planetary gear set rotationally coupled and positioned coaxial to the planetary reduction differential; and a mode clutch configured to selectively transition the Ravigneaux three-speed mode planetary gear set between two of three modes;

wherein the mode clutch is configured to:

in a first mode, ground a carrier or a ring gear in the Ravigneaux three-speed mode planetary gear set;

in a second mode, ground a second sun gear in the Ravigneaux three-speed mode planetary gear set; and in a third mode, rotationally couple the carrier or the ring gear to the second sun gear in the Ravigneaux three-speed mode planetary gear set;

wherein the planetary reduction differential includes a first planetary gear set directly rotationally coupled to a second planetary gear set;

wherein a sun gear in the first planetary gear set is directly coupled to an input shaft of the planetary reduction differential;

wherein a carrier in the first planetary gear set is directly coupled to an output shaft;

wherein a ring gear in the second planetary gear set is directly coupled to an output shaft;

wherein a ring gear in the first planetary gear set is directly rotationally coupled to a sun gear in the second planetary gear set; and wherein a carrier in the second planetary gear set is grounded.

15. The electric axle of claim 14, wherein a ring gear or a carrier in the Ravigneaux three-speed mode planetary gear set is coupled to the planetary reduction differential input shaft.

* * * * *